United States Patent
Vu et al.

(10) Patent No.: US 11,706,239 B2
(45) Date of Patent: Jul. 18, 2023

(54) SYSTEMS AND METHODS FOR DETECTING VULNERABILITIES IN NETWORK PROCESSES DURING RUNTIME

(71) Applicant: Cisco Technology, Inc., San Jose, CA (US)

(72) Inventors: Hai Vu, San Jose, CA (US); Thanh Nhan Nguyen, Mountain View, CA (US); Vaishali Palkar, San Jose, CA (US); Varun Malhotra, Sunnyvale, CA (US); Shih-Chun Chang, San Jose, CA (US); Xin Liu, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 202 days.

(21) Appl. No.: 17/003,450

(22) Filed: Aug. 26, 2020

(65) Prior Publication Data

US 2022/0070197 A1   Mar. 3, 2022

(51) Int. Cl.
    *H04L 9/40*   (2022.01)
(52) U.S. Cl.
    CPC ................. *H04L 63/1433* (2013.01)
(58) Field of Classification Search
    CPC ... H04L 63/1433; G06F 21/577; G06F 21/566
    See application file for complete search history.

(56) References Cited

U.S. PATENT DOCUMENTS

| 8,561,187 | B1 * | 10/2013 | Hegli | H04L 63/1491 |
| | | | | 726/22 |
| 9,094,448 | B2 | 7/2015 | Benefield | |
| 9,158,915 | B1 | 10/2015 | Yumer et al. | |
| 9,846,780 | B2 | 12/2017 | Tonn et al. | |
| 10,528,745 | B2 | 1/2020 | Li | |
| 2013/0174263 | A1 | 7/2013 | Nunez Di Croce | |

(Continued)

FOREIGN PATENT DOCUMENTS

| CN | 105956661 A | * | 9/2016 | ............... G06N 3/08 |
| CN | 106982231 A | * | 7/2017 | |
| CN | 114201758 A | * | 3/2022 | ............. G06F 21/57 |

OTHER PUBLICATIONS

International Search Report and Written Opinion from the International Searching Authority, dated Nov. 17, 2021, 11 pages, for corresponding International Patent Application No. PCT/US2021/046341.

*Primary Examiner* — Sarah Su
(74) *Attorney, Agent, or Firm* — Polsinelli

(57) ABSTRACT

Systems, methods, and non-transitory computer-readable storage media are disclosed for detecting vulnerabilities in real-time during execution of a process or an application. In one example, a device may have one or more memories storing computer-readable instructions and one or more processors configured to execute the computer-readable instructions to obtain real-time process information associated with a process executing in an endpoint. The device can then determine package information for a package associated with the process based on the process information. The device can then identify at least one vulnerability associated with the package information using a database of vulnerabilities stored on a backend component of the network. The backend component may have a database of vulnerabilities for packages.

15 Claims, 5 Drawing Sheets

(56) References Cited

U.S. PATENT DOCUMENTS

| | | | |
|---|---|---|---|
| 2014/0082729 A1* | 3/2014 | Shim | G06F 21/51 |
| | | | 726/23 |
| 2014/0201843 A1 | 7/2014 | Hibbert et al. | |
| 2017/0026387 A1 | 1/2017 | Vissamsetty et al. | |
| 2019/0042713 A1* | 2/2019 | Porcelli | G06F 21/121 |
| 2019/0311130 A1 | 10/2019 | Hodgman et al. | |
| 2020/0204468 A1* | 6/2020 | Nickolov | H04L 43/0817 |
| 2021/0019423 A1* | 1/2021 | DuBois | G06F 21/562 |
| 2021/0200840 A1* | 7/2021 | Kannan | G06F 8/73 |
| 2022/0012340 A1* | 1/2022 | Rao | H04L 63/20 |
| 2022/0108023 A1* | 4/2022 | Jung | G06F 21/577 |
| 2022/0164270 A1* | 5/2022 | Farimani | G06F 11/302 |

\* cited by examiner

SYSTEMS AND METHODS FOR DETECTING VULNERABILITIES IN NETWORK PROCESSES DURING RUNTIME

TECHNICAL FIELD

The present technology pertains to process analytics, and more specifically to detecting vulnerabilities in real-time during execution of a process or an application using process information, package information, and a database stored in a location other than an endpoint, on which the process runs.

BACKGROUND

A typical system stores numerous packages. Each package further contains numerous processes that can execute at innumerable different points in time. Any of these numerous processes may have a vulnerability, which may negatively impact system or application performance and/or users of the systems. These effects are further exacerbated when the systems are nodes of an enterprise network. In other words, thousands and hundreds of thousands of processes may then have potential vulnerabilities. Although scans of packages may help identify potential vulnerabilities, these scans require large amounts of processing power.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

Figure 1:
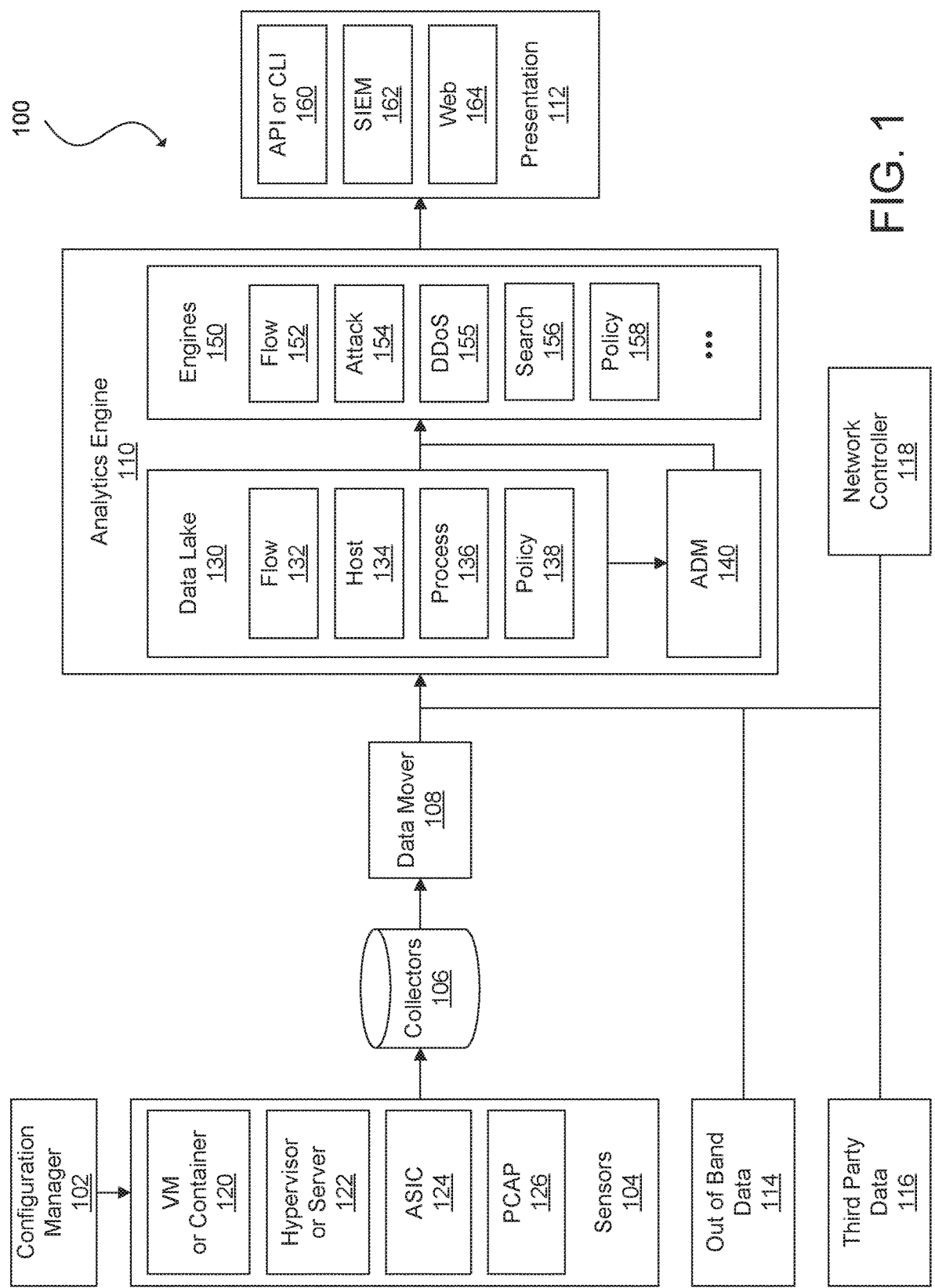
FIG. 1 illustrates an example of a network traffic monitoring system, according to one aspect of the present technology.

The present disclosure provides a mechanism for identifying vulnerabilities in processes by obtaining real-time process information, determining package information for packages associated with the processes using sensors installed within processes or on associated endpoints, and providing the package information and process information to a backend component. Accordingly, this mechanism can identify vulnerabilities in a process while the process is executing (during runtime), and eliminates the need for sensors and endpoints to maintain a database of Common Vulnerabilities and Exposures (CVEs) for detection of network/process vulnerabilities.

In one aspect, a method includes obtaining real-time process information associated with a process executing in an endpoint, determining package information for a package associated with the process based on the process information, and identifying at least one vulnerability associated with the package information using a database of vulnerabilities stored on a backend component of the network controller. The backend component may have a database of vulnerabilities for packages.

In another aspect, the process information may include an executable path and filename for the process.

In another aspect, the package information may include a package name, a package version and a package publisher.

In another aspect, the real-time process information are obtained using one or more sensors running on the endpoint.

In another aspect, the database of vulnerabilities is not stored at the endpoint.

In another aspect, identifying the at least one vulnerabilities may include providing the package information and the process information to the backend component to identify the at least one vulnerability based on the package information.

In another aspect, the method may further include fixing the at least one vulnerability.

In one aspect, a non-transitory computer-readable medium can include computer-readable instructions, which when executed by one or more processors, cause the one or more processors to obtain real-time process information associated with a process executing in an endpoint, determine package information for a package associated with the process based on the process information, and identify at least one vulnerability associated with the package information using a database of vulnerabilities stored on a backend component of the network controller. The backend component may have a database of vulnerabilities for packages In one aspect, a device can include one or more processors storing computer-readable instructions and one or more processors configured to execute the computer-readable instructions to obtain real-time process information associated with a process executing in an endpoint, determine package information for a package associated with the process based on the process information, and identify at least one vulnerability associated with the package information using a database of vulnerabilities stored on a backend component of the network controller. The backend component may have a database of vulnerabilities for packages.

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure provides a mechanism for identifying vulnerabilities in processes by obtaining process information during runtime, determining package information for packages associated with the processes using sensors installed within processes or on associated endpoints, and providing the package information and process information to a backend component. Accordingly, process vulnerabilities may be detected during runtime (in real-time) without the need for sensors and endpoints to maintain a database of Common Vulnerabilities and Exposures (CVEs) for detection of network/process vulnerabilities.

For example, a sensor may be deployed at an endpoint (e.g., a Windows sensor) that can collect information related to packages installed, as well as extract information from currently executed processes to associate the processes with their respective package (e.g., whether a process belongs to a specific package such as a version of Outlook in the above example). With information gathered for package information, execution path, executables, publisher, architecture, etc., vulnerabilities in packages may be periodically (or in an event-based manner such as installation of a new package) ascertained at a backend component, such as a cluster. The cluster may determine Common Vulnerabilities and Exposures (CVEs) in the packages based on consulting databases such as National Vulnerability Database (NVD) or others. Then, if any existing processes are associated with packages affected by a known CVE, such processes may be flagged, based on snapshots of processes obtained periodically. One advantageous aspect of this process is elimination of the need for requiring sensors/endpoints to maintain a database of known CVEs, resulting in more efficient use of network processing resources and capabilities.

Figure 2:
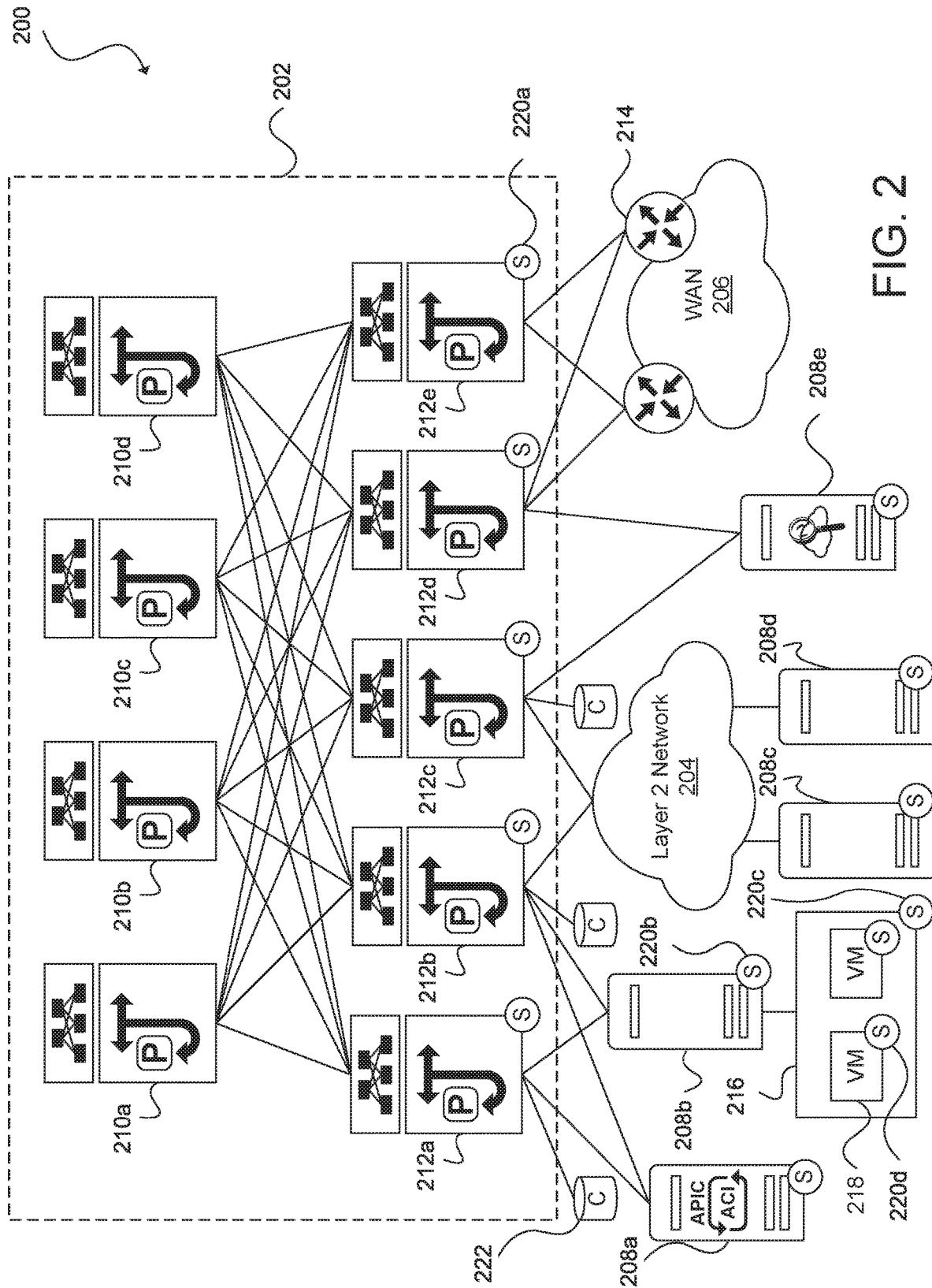
FIG. 2 illustrates an example of a network environment, according to one aspect of the present technology.

The disclosure now turns to an initial discussion of example systems and technologies for monitoring network activity and example network environments with reference to FIGS. 1 and 2 in which example mechanism and systems for identifying, detecting, and/or assessing vulnerabilities during runtime may be deployed. Subsequently, such mechanisms and systems will be described with reference to FIGS. 3 and 4.

Sensors deployed in a network can be used to gather network information related to network traffic of nodes operating in the network and process information for nodes and applications running in the network. Gathered network information can be analyzed to provide insights into the operation of the nodes in the network, otherwise referred to as analytics. In particular, discovered applications or inventories, application dependencies, policies, efficiencies, resource and bandwidth usage, and network flows can be determined for the network using the network traffic data. For example, an analytics engine can be configured to automate discovery of applications running in the network, map the applications' interdependencies, or generate a set of proposed network policies for implementation.

The analytics engine can monitor network information, process information, and other relevant information of traffic passing through the network using a sensor network that provides multiple perspectives for the traffic. The sensor network can include sensors for networking devices (e.g., routers, switches, network appliances), physical servers, hypervisors or shared kernels, and virtual partitions (e.g., VMs or containers), and other network elements. The analytics engine can analyze the network information, process information, and other pertinent information to determine various network insights.

Referring now to the drawings, FIG. 1 illustrates an example of a network traffic monitoring system, according to one aspect of the present disclosure. The network traffic monitoring system 100 can include a configuration manager 102, sensors 104, a collector module 106, a data mover module 108, an analytics engine 110, and a presentation module 112. In FIG. 1, the analytics engine 110 is also shown in communication with out-of-band data sources 114, third party data sources 116, and a network controller 118.

The configuration manager 102 can be used to provision and maintain the sensors 104, including installing sensor software or firmware in various nodes of a network, configuring the sensors 104, updating the sensor software or firmware, among other sensor management tasks. For example, the sensors 104 can be implemented as virtual partition images (e.g., virtual machine (VM) images or container images), and the configuration manager 102 can distribute the images to host machines. In general, a virtual partition may be an instance of a VM, container, sandbox, or other isolated software environment. The software environment may include an operating system and application software. For software running within a virtual partition, the virtual partition may appear to be, for example, one of many servers or one of many operating systems executed on a single physical server. The configuration manager 102 can instantiate a new virtual partition or migrate an existing partition to a different physical server. The configuration manager 102 can also be used to configure the new or migrated sensor.

The configuration manager 102 can monitor the health of the sensors 104. For example, the configuration manager 102 may request status updates and/or receive heartbeat messages, initiate performance tests, generate health checks, and perform other health monitoring tasks. In some embodiments, the configuration manager 102 can also authenticate the sensors 104. For instance, the sensors 104 can be assigned a unique identifier, such as by using a one-way hash function of a sensor's basic input/out system (BIOS) universally unique identifier (UUID) and a secret key stored by the configuration image manager 102. The UUID can be a large number that may be difficult for a malicious sensor or other device or component to guess. In some embodiments, the configuration manager 102 can keep the sensors 104 up to date by installing the latest versions of sensor software and/or applying patches. The configuration manager 102 can obtain these updates automatically from a local source or the Internet.

The sensors 104 can reside on various nodes of a network, such as a virtual partition (e.g., VM or container) 120; a hypervisor or shared kernel managing one or more virtual partitions and/or physical servers 122, an application-specific integrated circuit (ASIC) 124 of a switch, router, gateway, or other networking device, or a packet capture (pcap) 126 appliance (e.g., a standalone packet monitor, a device connected to a network devices monitoring port, a device connected in series along a main trunk of a datacenter, or similar device), or other element of a network. The sensors 104 can monitor network traffic between nodes, and send network traffic data and corresponding data (e.g., host data, process data, user data, etc.) to the collectors 106 for storage. For example, the sensors 104 can sniff packets being sent over its hosts' physical or virtual network interface card (NIC), or individual processes can be configured to report network traffic and corresponding data to the sensors 104. Incorporating the sensors 104 on multiple nodes and within multiple partitions of some nodes of the network can provide for robust capture of network traffic and corresponding data from each hop of data transmission. In some embodiments, each node of the network (e.g., VM, container, or other virtual partition 120, hypervisor, shared kernel, or physical server 122, ASIC 124, pcap 126, etc.) includes a respective sensor 104. However, it should be understood that various software and hardware configurations can be used to implement the sensor network 104.

As the sensors 104 capture communications and corresponding data, they may continuously send network traffic data to the collectors 106. The network traffic data can include metadata relating to a packet, a collection of packets, a flow, a bidirectional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics.

The sensors 104 can also determine additional data for each session, bidirectional flow, flow, packet, or other more granular or less granular network communication. The additional data can include host and/or endpoint information, virtual partition information, sensor information, process information, user information, tenant information, application information, network topology, application dependency mapping, cluster information, or other information corresponding to each flow.

In some embodiments, the sensors 104 can perform some preprocessing of the network traffic and corresponding data before sending the data to the collectors 106. For example, the sensors 104 can remove extraneous or duplicative data or they can create summaries of the data (e.g., latency, number of packets per flow, number of bytes per flow, number of flows, etc.). In some embodiments, the sensors 104 can be configured to only capture certain types of network information and disregard the rest. In some embodiments, the sensors 104 can be configured to capture only a representative sample of packets (e.g., every 1,000th packet or other suitable sample rate) and corresponding data.

Since the sensors 104 may be located throughout the network, network traffic and corresponding data can be collected from multiple vantage points or multiple perspectives in the network to provide a more comprehensive view of network behavior. The capture of network traffic and corresponding data from multiple perspectives rather than just at a single sensor located in the data path or in communication with a component in the data path, allows the data to be correlated from the various data sources, which may be used as additional data points by the analytics engine 110. Further, collecting network traffic and corresponding data from multiple points of view ensures more accurate data is captured. For example, other types of sensor networks may be limited to sensors running on external-facing network devices (e.g., routers, switches, network appliances, etc.) such that east-west traffic, including VM-to-VM or container-to-container traffic on a same host, may not be monitored. In addition, packets that are dropped before traversing a network device or packets containing errors may not be accurately monitored by other types of sensor networks. The sensor network 104 of various embodiments substantially mitigates or eliminates these issues altogether by locating sensors at multiple points of potential failure. Moreover, the network traffic monitoring system 100 can verify multiple instances of data for a flow (e.g., source endpoint flow data, network device flow data, and endpoint flow data) against one another.

In some embodiments, the network traffic monitoring system 100 can assess a degree of accuracy of flow data sets from multiple sensors and utilize a flow data set from a single sensor determined to be the most accurate and/or complete. The degree of accuracy can be based on factors such as network topology (e.g., a sensor closer to the source may be more likely to be more accurate than a sensor closer to the destination), a state of a sensor or a node hosting the sensor (e.g., a compromised sensor/node may have less accurate flow data than an uncompromised sensor/node), or flow data volume (e.g., a sensor capturing a greater number of packets for a flow may be more accurate than a sensor capturing a smaller number of packets).

In some embodiments, the network traffic monitoring system 100 can assemble the most accurate flow data set and corresponding data from multiple sensors. For instance, a first sensor along a data path may capture data for a first packet of a flow but may be missing data for a second packet of the flow while the situation is reversed for a second sensor along the data path. The network traffic monitoring system 100 can assemble data for the flow from the first packet captured by the first sensor and the second packet captured by the second sensor.

As discussed, the sensors 104 can send network traffic and corresponding data to the collectors 106. In some embodiments, each sensor can be assigned to a primary collector and a secondary collector as part of a high availability scheme. If the primary collector fails or communications between the sensor and the primary collector are not otherwise possible, a sensor can send its network traffic and corresponding data to the secondary collector. In other embodiments, the sensors 104 are not assigned specific collectors but the network traffic monitoring system 100 can determine an optimal collector for receiving the network traffic and corresponding data through a discovery process. In such embodiments, a sensor can change where it sends it network traffic and corresponding data if its environments changes, such as if a default collector fails or if the sensor is migrated to a new location and it would be optimal for the sensor to send its data to a different collector. For example, it may be preferable for the sensor to send its network traffic and corresponding data on a particular path and/or to a particular collector based on latency, shortest path, monetary cost (e.g., using private resources versus a public resources provided by a public cloud provider), error rate, or some combination of these factors. In other embodiments, a sensor can send different types of network traffic and corresponding data to different collectors. For example, the sensor can send first network traffic and corresponding data related to one type of process to one collector and second network traffic and corresponding data related to another type of process to another collector.

The collectors 106 can be any type of storage medium that can serve as a repository for the network traffic and corresponding data captured by the sensors 104. In some embodiments, data storage for the collectors 106 is located in an in-memory database, such as dashDB from IBM®, although it should be appreciated that the data storage for the collectors 106 can be any software and/or hardware capable of providing rapid random access speeds typically used for analytics software. In various embodiments, the collectors 106 can utilize solid state drives, disk drives, magnetic tape drives, or a combination of the foregoing according to cost, responsiveness, and size requirements. Further, the collectors 106 can utilize various database structures such as a normalized relational database or a NoSQL database, among others.

In some embodiments, the collectors 106 may only serve as network storage for the network traffic monitoring system 100. In such embodiments, the network traffic monitoring system 100 can include a data mover module 108 for retrieving data from the collectors 106 and making the data available to network clients, such as the components of the analytics engine 110. In effect, the data mover module 108 can serve as a gateway for presenting network-attached storage to the network clients. In other embodiments, the collectors 106 can perform additional functions, such as organizing, summarizing, and preprocessing data. For example, the collectors 106 can tabulate how often packets of certain sizes or types are transmitted from different nodes of the network. The collectors 106 can also characterize the traffic flows going to and from various nodes. In some embodiments, the collectors 106 can match packets based on sequence numbers, thus identifying traffic flows and connection links. As it may be inefficient to retain all data indefinitely in certain circumstances, in some embodiments, the collectors 106 can periodically replace detailed network traffic data with consolidated summaries. In this manner, the collectors 106 can retain a complete dataset describing one period (e.g., the past minute or other suitable period of time), with a smaller dataset of another period (e.g., the previous 2-10 minutes or other suitable period of time), and progressively consolidate network traffic and corresponding data of other periods of time (e.g., day, week, month, year, etc.). In some embodiments, network traffic and corresponding data for a set of flows identified as normal or routine can be winnowed at an earlier period of time while a more complete data set may be retained for a lengthier period of time for another set of flows identified as anomalous or as an attack.

Computer networks may be exposed to a variety of different attacks that can reveal vulnerabilities of computer systems in order to compromise their security. Some network traffic may be associated with malicious programs or devices. The analytics engine 110 may be provided with examples of network states corresponding to an attack and network states corresponding to normal operation. The analytics engine 110 can then analyze network traffic and corresponding data to recognize when the network is under attack. In some embodiments, the network may operate within a trusted environment for a period of time so that the analytics engine 110 can establish a baseline of normal operation. Since malware is constantly evolving and changing, machine learning may be used to dynamically update models for identifying malicious traffic patterns.

In some embodiments, the analytics engine 110 may be used to identify observations which differ from other examples in a dataset. For example, if a training set of example data with known outlier labels exists, supervised anomaly detection techniques may be used. Supervised anomaly detection techniques utilize data sets that have been labeled as normal and abnormal and train a classifier. In a case in which it is unknown whether examples in the training data are outliers, unsupervised anomaly techniques may be used. Unsupervised anomaly detection techniques may be used to detect anomalies in an unlabeled test data set under the assumption that the majority of instances in the data set are normal by looking for instances that seem to fit to the remainder of the data set.

The analytics engine 110 can include a data lake 130, an application dependency mapping (ADM) module 140, and elastic processing engines 150. The data lake 130 is a large-scale storage repository that provides massive storage for various types of data, enormous processing power, and the ability to handle nearly limitless concurrent tasks or jobs. In some embodiments, the data lake 130 is implemented using the Hadoop® Distributed File System (HDFS™) from Apache® Software Foundation of Forest Hill, Md. HDFS™ is a highly scalable and distributed file system that can scale to thousands of cluster nodes, millions of files, and petabytes of data. HDFS™ is optimized for batch processing where data locations are exposed to allow computations to take place where the data resides. HDFS™ provides a single namespace for an entire cluster to allow for data coherency in a write-once, read-many access model. That is, clients can only append to existing files in the node. In HDFS™, files are separated into blocks, which are typically 64 MB in size and are replicated in multiple data nodes. Clients access data directly from data nodes.

In some embodiments, the data mover 108 receives raw network traffic and corresponding data from the collectors 106 and distributes or pushes the data to the data lake 130. The data lake 130 can also receive and store out-of-band data 114, such as statuses on power levels, network availability, server performance, temperature conditions, cage door positions, and other data from internal sources, and third party data 116, such as security reports (e.g., provided by Cisco® Systems, Inc. of San Jose, Calif., Arbor Networks® of Burlington, Mass., Symantec® Corp. of Sunnyvale, Calif., Sophos® Group plc of Abingdon, England, Microsoft® Corp. of Seattle, Wash., Verizon® Communications, Inc. of New York, N.Y., among others), geolocation data, IP watch lists, Whois data, configuration management database (CMDB) or configuration management system (CMS) as a service, and other data from external sources. In other embodiments, the data lake 130 may instead fetch or pull raw traffic and corresponding data from the collectors 106 and relevant data from the out-of-band data sources 114 and the third party data sources 116. In yet other embodiments, the functionality of the collectors 106, the data mover 108, the out-of-band data sources 114, the third party data sources 116, and the data lake 130 can be combined. Various combinations and configurations are possible as would be known to one of ordinary skill in the art.

Each component of the data lake 130 can perform certain processing of the raw network traffic data and/or other data (e.g., host data, process data, user data, out-of-band data or third party data) to transform the raw data to a form useable by the elastic processing engines 150. In some embodiments, the data lake 130 can include repositories for flow attributes 132, host and/or endpoint attributes 134, process attributes 136, and policy attributes 138. In some embodiments, the data lake 130 can also include repositories for VM or container attributes, application attributes, tenant attributes, network topology, application dependency maps, cluster attributes, etc.

The flow attributes 132 relate to information about flows traversing the network. A flow is generally one or more packets sharing certain attributes that are sent within a network within a specified period of time. The flow attributes 132 can include packet header fields such as a source address (e.g., Internet Protocol (IP) address, Media Access Control (MAC) address, Domain Name System (DNS) name, or other network address), source port, destination address, destination port, protocol type, class of service, among other fields. The source address may correspond to a first endpoint (e.g., network device, physical server, virtual partition, etc.) of the network, and the destination address may correspond to a second endpoint, a multicast group, or a broadcast domain. The flow attributes 132 can also include aggregate packet data such as flow start time, flow end time, number of packets for a flow, number of bytes for a flow, the union of TCP flags for a flow, among other flow data.

The host and/or endpoint attributes 134 describe host and/or endpoint data for each flow, and can include host and/or endpoint name, network address, operating system, CPU usage, network usage, disk space, ports, logged users, scheduled jobs, open files, and information regarding files and/or directories stored on a host and/or endpoint (e.g., presence, absence, or modifications of log files, configuration files, device special files, or protected electronic information). As discussed, in some embodiments, the host and/or endpoints attributes 134 can also include the out-of-band data 114 regarding hosts such as power level, temperature, and physical location (e.g., room, row, rack, cage door position, etc.) or the third party data 116 such as whether a host and/or endpoint is on an IP watch list or otherwise associated with a security threat, Whois data, or geocoordinates. In some embodiments, the out-of-band data 114 and the third party data 116 may be associated by process, user, flow, or other more granular or less granular network element or network communication.

The process attributes 136 relate to process data corresponding to each flow, and can include process name (e.g., bash, httpd, netstat, etc.), ID, parent process ID, path (e.g., /usr2/username/bin/, /usr/local/bin, /usr/bin, etc.), CPU utilization, memory utilization, memory address, scheduling information, nice value, flags, priority, status, start time, terminal type, CPU time taken by the process, the command that started the process, and information regarding a process owner (e.g., user name, ID, user's real name, e-mail address, user's groups, terminal information, login time, expiration date of login, idle time, and information regarding files and/or directories of the user).

The policy attributes 138 contain information relating to network policies. Policies establish whether a particular flow is allowed or denied by the network as well as a specific route by which a packet traverses the network. Policies can also be used to mark packets so that certain kinds of traffic receive differentiated service when used in combination with queuing techniques such as those based on priority, fairness, weighted fairness, token bucket, random early detection, round robin, among others. The policy attributes 138 can include policy statistics such as a number of times a policy was enforced or a number of times a policy was not enforced. The policy attributes 138 can also include associations with network traffic data. For example, flows found to be non-conformant can be linked or tagged with corresponding policies to assist in the investigation of non-conformance.

The analytics engine 110 may include any number of engines 150, including for example, a flow engine 152 for identifying flows (e.g., flow engine 152) or an attacks engine 154 for identify attacks to the network. In some embodiments, the analytics engine can include a separate distributed denial of service (DDoS) attack engine 155 for specifically detecting DDoS attacks. In other embodiments, a DDoS attack engine may be a component or a sub-engine of a general attacks engine. In some embodiments, the attacks engine 154 and/or the DDoS engine 155 can use machine learning techniques to identify security threats to a network. For example, the attacks engine 154 and/or the DDoS engine 155 can be provided with examples of network states corresponding to an attack and network states corresponding to normal operation. The attacks engine 154 and/or the DDoS engine 155 can then analyze network traffic data to recognize when the network is under attack. In some embodiments, the network can operate within a trusted environment for a time to establish a baseline for normal network operation for the attacks engine 154 and/or the DDoS.

The analytics engine 110 may further include a search engine 156. The search engine 156 may be configured, for example to perform a structured search, an NLP (Natural Language Processing) search, or a visual search. Data may be provided to the engines from one or more processing components.

The analytics engine 110 can also include a policy engine 158 that manages network policy, including creating and/or importing policies, monitoring policy conformance and non-conformance, enforcing policy, simulating changes to policy or network elements affecting policy, among other policy-related tasks.

The ADM module 140 can determine dependencies of applications of the network. That is, particular patterns of traffic may correspond to an application, and the interconnectivity or dependencies of the application can be mapped to generate a graph for the application (i.e., an application dependency mapping). In this context, an application refers to a set of networking components that provides connectivity for a given set of workloads. For example, in a three-tier architecture for a web application, first endpoints of the web tier, second endpoints of the application tier, and third endpoints of the data tier make up the web application. The ADM module 140 can receive input data from various repositories of the data lake 130 (e.g., the flow attributes 132, the host and/or endpoint attributes 134, the process attributes 136, etc.). The ADM module 140 may analyze the input data to determine that there is first traffic flowing between external endpoints on port 80 of the first endpoints corresponding to Hypertext Transfer Protocol (HTTP) requests and responses. The input data may also indicate second traffic between first ports of the first endpoints and second ports of the second endpoints corresponding to application server requests and responses and third traffic flowing between third ports of the second endpoints and fourth ports of the third endpoints corresponding to database requests and responses. The ADM module 140 may define an ADM for the web application as a three-tier application including a first EPG comprising the first endpoints, a second EPG comprising the second endpoints, and a third EPG comprising the third endpoints.

The presentation module 112 can include an application programming interface (API) or command line interface (CLI) 160, a security information and event management (SIEM) interface 162, and a web front-end 164. As the analytics engine 110 processes network traffic and corresponding data and generates analytics data, the analytics data may not be in a human-readable form or it may be too voluminous for a user to navigate. The presentation module 112 can take the analytics data generated by analytics engine 110 and further summarize, filter, and organize the analytics data as well as create intuitive presentations for the analytics data.

In some embodiments, the API or CLI 160 can be implemented using Hadoop® Hive from Apache® for the back end, and Java® Database Connectivity (JDBC) from Oracle® Corporation of Redwood Shores, Calif., as an API layer. Hive is a data warehouse infrastructure that provides data summarization and ad hoc querying. Hive provides a mechanism to query data using a variation of structured query language (SQL) that is called HiveQL. JDBC is an application programming interface (API) for the programming language Java®, which defines how a client may access a database.

In some embodiments, the SIEM interface 162 can be implemented using Kafka for the back end, and software provided by Splunk®, Inc. of San Francisco, Calif. as the SIEM platform. Kafka is a distributed messaging system that is partitioned and replicated. Kafka uses the concept of topics. Topics are feeds of messages in specific categories.

In some embodiments, Kafka can take raw packet captures and telemetry information from the data mover 108 as input, and output messages to a SIEM platform, such as Splunk®. The Splunk® platform is utilized for searching, monitoring, and analyzing machine-generated data.

In some embodiments, the web front-end 164 can be implemented using software provided by MongoDB®, Inc. of New York, N.Y. and Hadoop® ElasticSearch from Apache® for the back-end, and Ruby on Rails™ as the web application framework. MongoDB® is a document-oriented NoSQL database based on documents in the form of JavaScript® Object Notation (JSON) with dynamic schemas. ElasticSearch is a scalable and real-time search and analytics engine that provides domain-specific language (DSL) full querying based on JSON. Ruby on Rails™ is model-view-controller (MVC) framework that provides default structures for a database, a web service, and web pages. Ruby on Rails™ relies on web standards such as JSON or extensible markup language (XML) for data transfer, and hypertext markup language (HTML), cascading style sheets, (CSS), and JavaScript® for display and user interfacing.

Although FIG. 1 illustrates an example configuration of the various components of a network traffic monitoring system, those of skill in the art will understand that the components of the network traffic monitoring system 100 or any system described herein can be configured in a number of different ways and can include any other type and number of components. For example, the sensors 104, the collectors 106, the data mover 108, and the data lake 130 can belong to one hardware and/or software module or multiple separate modules. Other modules can also be combined into fewer components and/or further divided into more components.

FIG. 2 illustrates an example of a network environment 200, according to one aspect of the present technology. In some embodiments, a network traffic monitoring system, such as the network traffic monitoring system 100 of FIG. 1, can be implemented in the network environment 200. It should be understood that, for the network environment 200 and any environment discussed herein, there can be additional or fewer nodes, devices, links, networks, or components in similar or alternative configurations. Embodiments with different numbers and/or types of clients, networks, nodes, cloud components, servers, software components, devices, virtual or physical resources, configurations, topologies, services, appliances, deployments, or network devices are also contemplated herein. Further, the network environment 200 can include any number or type of resources, which can be accessed and utilized by clients or tenants. The illustrations and examples provided herein are for clarity and simplicity.

The network environment 200 can include a network fabric 202, a Layer 2 (L2) network 204, a Layer 3 (L3) network 206, and servers 208a, 208b, 208c, 208d, and 208e (collectively, 208). The network fabric 202 can include spine switches 210a, 210b, 210c, and 210d (collectively, "210") and leaf switches 212a, 212b, 212c, 212d, and 212e (collectively, "212"). The spine switches 210 can connect to the leaf switches 212 in the network fabric 202. The leaf switches 212 can include access ports (or non-fabric ports) and fabric ports. The fabric ports can provide uplinks to the spine switches 210, while the access ports can provide connectivity to endpoints (e.g., the servers 208), internal networks (e.g., the L2 network 204), or external networks (e.g., the L3 network 206).

The leaf switches 212 can reside at the edge of the network fabric 202, and can thus represent the physical network edge. For instance, in some embodiments, the leaf switches 212d and 212e operate as border leaf switches in communication with edge devices 214 located in the external network 206. The border leaf switches 212d and 212e may be used to connect any type of external network device, service (e.g., firewall, deep packet inspector, traffic monitor, load balancer, etc.), or network (e.g., the L3 network 206) to the fabric 202.

Although the network fabric 202 is illustrated and described herein as an example leaf-spine architecture, one of ordinary skill in the art will readily recognize that various embodiments can be implemented based on any network topology, including any data center or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. Thus, in some embodiments, the leaf switches 212 can be top-of-rack switches configured according to a top-of-rack architecture. In other embodiments, the leaf switches 212 can be aggregation switches in any particular topology, such as end-of-row or middle-of-row topologies. In some embodiments, the leaf switches 212 can also be implemented using aggregation switches.

Moreover, the topology illustrated in FIG. 2 and described herein is readily scalable and may accommodate a large number of components, as well as more complicated arrangements and configurations. For example, the network may include any number of fabrics 202, which may be geographically dispersed or located in the same geographic area. Thus, network nodes may be used in any suitable network topology, which may include any number of servers, virtual machines or containers, switches, routers, appliances, controllers, gateways, or other nodes interconnected to form a large and complex network. Nodes may be coupled to other nodes or networks through one or more interfaces employing any suitable wired or wireless connection, which provides a viable pathway for electronic communications.

Network communications in the network fabric 202 can flow through the leaf switches 212. In some embodiments, the leaf switches 212 can provide endpoints (e.g., the servers 208), internal networks (e.g., the L2 network 204), or external networks (e.g., the L3 network 206) access to the network fabric 202, and can connect the leaf switches 212 to each other. In some embodiments, the leaf switches 212 can connect endpoint groups (EPGs) to the network fabric 202, internal networks (e.g., the L2 network 204), and/or any external networks (e.g., the L3 network 206). EPGs are groupings of applications, or application components, and tiers for implementing forwarding and policy logic. EPGs can allow for separation of network policy, security, and forwarding from addressing by using logical application boundaries. EPGs can be used in the network environment 200 for mapping applications in the network. For example, EPGs can comprise a grouping of endpoints in the network indicating connectivity and policy for applications.

As discussed, the servers 208 can connect to the network fabric 202 via the leaf switches 212. For example, the servers 208a and 208b can connect directly to the leaf switches 212a and 212b, which can connect the servers 208a and 208b to the network fabric 202 and/or any of the other leaf switches. The servers 208c and 208d can connect to the leaf switches 212b and 212c via the L2 network 204. The servers 208c and 208d and the L2 network 204 make up a local area network (LAN). LANs can connect nodes over dedicated private communications links located in the same general physical location, such as a building or campus.

The WAN 206 can connect to the leaf switches 212d or 212e via the L3 network 206. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. The endpoints 208 can include any communication device or component, such as a computer, server, blade, hypervisor, virtual machine, container, process (e.g., running on a virtual machine), switch, router, gateway, host, device, external network, etc.

In some embodiments, the network environment 200 also includes a network controller running on the host 208a. The network controller is implemented using the Application Policy Infrastructure Controller (APIC™) from Cisco®. The APIC™ provides a centralized point of automation and management, policy programming, application deployment, and health monitoring for the fabric 202. In some embodiments, the APIC™ is operated as a replicated synchronized clustered controller. In other embodiments, other configurations or software-defined networking (SDN) platforms can be utilized for managing the fabric 202.

In some embodiments, a physical server 208 may have instantiated thereon a hypervisor 216 for creating and running one or more virtual switches (not shown) and one or more virtual machines 218, as shown for the host 208b. In other embodiments, physical servers may run a shared kernel for hosting containers. In yet other embodiments, the physical server 208 can run other software for supporting other virtual partitioning approaches. Networks in accordance with various embodiments may include any number of physical servers hosting any number of virtual machines, containers, or other virtual partitions. Hosts may also comprise blade/physical servers without virtual machines, containers, or other virtual partitions, such as the servers 208a, 208c, 208d, and 208e.

The network environment 200 can also integrate a network traffic monitoring system, such as the network traffic monitoring system 100 shown in FIG. 1. For example, the network traffic monitoring system of FIG. 2 includes sensors 220a, 220b, 220c, and 220d (collectively, "220"), collectors 222, and an analytics engine, such as the analytics engine 110 of FIG. 1, executing on the server 208e. The analytics engine 208e can receive and process network traffic data collected by the collectors 222 and detected by the sensors 220 placed on nodes located throughout the network environment 200. Although the analytics engine 208e is shown to be a standalone network appliance in FIG. 2, it will be appreciated that the analytics engine 208e can also be implemented as a virtual partition (e.g., VM or container) that can be distributed onto a host or cluster of hosts, software as a service (SaaS), or other suitable method of distribution. In some embodiments, the sensors 220 run on the leaf switches 212 (e.g., the sensor 220a), the hosts 208 (e.g., the sensor 220b), the hypervisor 216 (e.g., the sensor 220c), and the VMs 218 (e.g., the sensor 220d). In other embodiments, the sensors 220 can also run on the spine switches 210, virtual switches, service appliances (e.g., firewall, deep packet inspector, traffic monitor, load balancer, etc.) and in between network elements. In some embodiments, sensors 220 can be located at each (or nearly every) network component to capture granular packet statistics and data at each hop of data transmission. In other embodiments, the sensors 220 may not be installed in all components or portions of the network (e.g., shared hosting environment in which customers have exclusive control of some virtual machines).

As shown in FIG. 2, a host may include multiple sensors 220 running on the host (e.g., the host sensor 220b) and various components of the host (e.g., the hypervisor sensor 220c and the VM sensor 220d) so that all (or substantially all) packets traversing the network environment 200 may be monitored. For example, if one of the VMs 218 running on the host 208b receives a first packet from the WAN 206, the first packet may pass through the border leaf switch 212d, the spine switch 210b, the leaf switch 212b, the host 208b, the hypervisor 216, and the VM. Since all or nearly all of these components contain a respective sensor, the first packet will likely be identified and reported to one of the collectors 222. As another example, if a second packet is transmitted from one of the VMs 218 running on the host 208b to the host 208d, sensors installed along the data path, such as at the VM 218, the hypervisor 216, the host 208b, the leaf switch 212b, and the host 208d will likely result in capture of metadata from the second packet.

With example systems and technologies for monitoring network activity and example network environments described with reference to FIGS. 1 and 2, the disclosure now turns to description of example mechanisms and systems for identifying, detecting, and/or assessing process/application vulnerabilities during runtime with reference to FIGS. 3 and 4.

Figure 3:
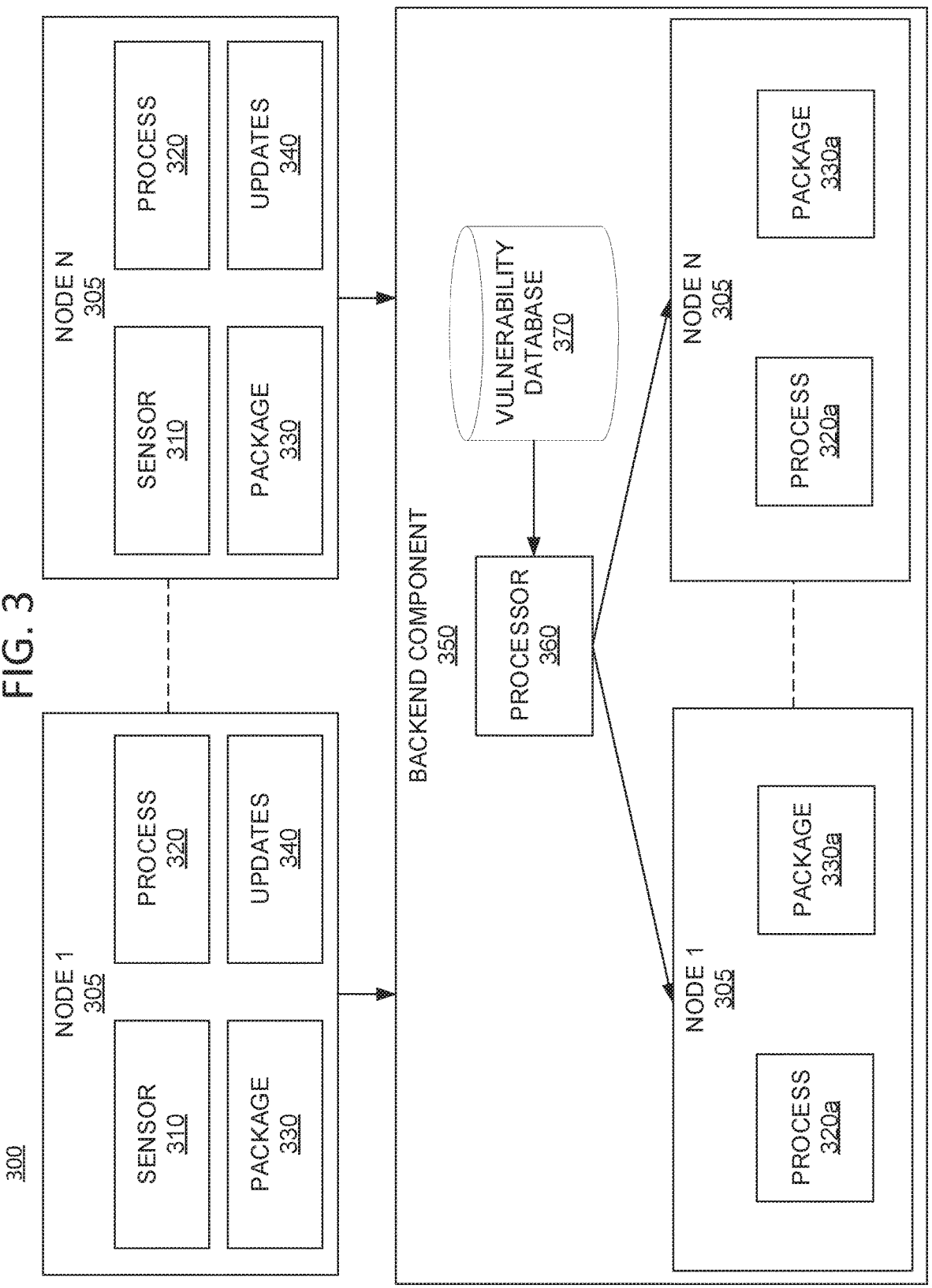
FIG. 3 illustrates a schematic diagram of a vulnerability mapping system, according to one aspect of the present technology.

FIG. 3 illustrates a schematic diagram of an example process vulnerability mapping system 300, in accordance with one aspect of the present technology. FIG. 3 will be described with reference to FIGS. 1 and 2. The process vulnerability mapping system 300 may have one or more sensors 310, one or more processes 320 from one or more packages 330, a backend component 350, and a vulnerability database 370. Additionally process vulnerability mapping system 300 can be implemented, for example, as a network controller (e.g. network controller 118 in FIG. 1).

As discussed above, nodes 305 (identified as Nodes 1-N 305 with N being an integer equal to greater than 1) can be configured as various elements of a network, such as a virtual partition (e.g., VM or container) 120, hypervisor, shared kernel, one or more physical servers 122, ASIC 124, PCAP 126, switches, routers, gateways, networking devices, etc.

Sensors 310 may be the same as sensor 104 discussed above with reference to FIG. 1. Sensors 310 can reside on various nodes 305 or endpoints of a network, such as a virtual partition (e.g., VM or container); a hypervisor or shared kernel managing one or more virtual partitions and/or physical servers, an application-specific integrated circuit (ASIC) of a switch, router, gateway, or other networking device, or a packet capture (pcap) appliance (e.g., a standalone packet monitor, a device connected to a network devices monitoring port, a device connected in series along a main trunk of a datacenter, or similar device), or other element of a network. Sensors 310 can also be in the form of executable software embedded within network applications and processes.

Sensors 310 can monitor network traffic between nodes, monitor processes executed on sensors 310, and send network traffic data and other data (e.g., host data, process data, user data, package data, vulnerability data, etc.) to the backend component 350. For example, sensors 310 can sniff packets being sent over its hosts' physical or virtual network interface card (NIC), or individual processes can be configured to report network traffic and corresponding data to sensors 310. Incorporating sensors 310 on multiple nodes and within multiple partitions of some nodes of the network can provide for robust capture of network traffic and corresponding data from each hop of data transmission. In some embodiments, each node of the network (e.g., VM, container, or other virtual partition, hypervisor, shared kernel, or physical server, ASIC, pcap, etc.) includes a respective sensor 310. However, it should be understood that various software and hardware configurations can be used to implement a network of sensors 310. It is further considered that as sensors 310 monitor data of processes running thereon, determine process information, extract package information associated with corresponding processes, generate logs or reports of usage on a respective node of the network, etc. Moreover, sensors 310 (and/or endpoints associated with sensors 310) are configured to extract process information from processes 320 running thereon, identify and locate packages 330, extract package information associated with packages 330, and report or provide the process information and package information to backend component 350 for analysis. Additionally, sensors 310 can create a running snapshot of processes executing thereon and send the snapshot to backend component 350. In some implementations, sensors 310 may also index and scan packages 330.

One or more processes 320 may run on and/or communicate with sensors 310. Processes 320 may have process attributes or process information like process attributes 136 as discussed with respect to FIG. 1. Process attributes may relate to process data corresponding to each flow, and can include process name (e.g., apache, nginx, ntpd, bash, httpd, netstat, etc.), process ID, parent process ID, executable path (e.g., /usr2/username/bin/, /usr/local/bin, /usr/bin, etc.), CPU utilization, memory utilization, memory address, scheduling information, nice value, flags, priority, status, start time, terminal type, CPU time taken by the process, the command that started the process, and information regarding a process owner (e.g., user name, ID, user's real name, e-mail address, user's groups, terminal information, login time, expiration date of login, idle time, and information regarding files and/or directories of the user).

One or more packages 330 may run on and/or communicate with sensors 310. Packages 330 may include computer-readable instructions corresponding to processes 320. For example, packages may be installed on sensors 310 using MSI installers or EXE installers. Furthermore, packages 330 can be located based on process attributes of processes 320. For example, packages 330 can be located based on executable paths of respective processes 320. Packages 330 may have package attributes or package information. Package attributes may relate to package data and can include package name (e.g. packagename0.tar.gz, packagename1.apk, etc.), package ID, package version number, package size, package type (e.g. 32-bit or 64-bit), date of installation, date of last modification, executable path (e.g., /usr2/username/bin/, /usr/local/bin, /usr/bin, etc.), processes included in and/or associated with the packages, package publisher, etc. Furthermore, the executable path of packages 330 may be the same as the executable path of processes 320 due to the nature of the packages 330. Sensors 310 can collect package information and send the package information to backend component 350. For example, sensors 310 can collect package information using MSI API and/or an enumerating registry.

One or more updates, patches, and/or fixed CVEs 340 (updates 340) may be configured and/or installed on sensors 310. Updates 340 may be configured to address improvements, for example, to processes 320 and/or packages 330. For example, updates 340 may provide improved security to processes 320 and/or packages 330, so that updated versions of processes 320 and/or packages 330 are not vulnerable to known vulnerabilities and/or exploits. In one aspect, updates 340 may also include updates installed for an operating system installed on sensors 310. For example, updates 340 may include Windows updates.

Backend component 350 may be in communication with sensors 310, either directly and/or through collectors and/or data movers, similar to collectors 106 and data movers 108 as discussed above with respect to FIG. 1, respectively. Backend component 350 may be an analytics engine similar to analytics engine 110 as discussed with respect to FIG. 1. Backend component 350 is configured to receive process attributes or process information associated with processes executing on sensors 310. Furthermore, backend component 350 may also be configured to receive package attributes or package information associated with processes executing on sensors 310. Backend component 350 may then utilize vulnerability database 370 to identify processes 320*a* and packages 330*a* that may have vulnerabilities or exploits. Backend component 350 may also be configured to have or be an API, such that backend component 350 can notify and/or display vulnerabilities to a user or an administrator. It is further contemplated that backend component 350 may have one or more processors 360 to implement the above.

In one aspect, backend component 350 may be a cluster. Accordingly, backend component 350 may be configured with a plurality of processors 360 to distribute receiving process information and/or package information, accessing vulnerability database 370, and identifying vulnerabilities across various nodes. For example, backend component 350 may be a software cluster configured to allocate receiving process information and/or package information to certain nodes, while allocating accessing vulnerability database 370 and identifying vulnerabilities to other nodes.

Vulnerability database 370 may be stored on and/or in communication with backend component 350. Vulnerability database 370 stores reports, information, and vulnerabilities associated with packages 330. Additionally, vulnerability database 370 is configured to communicate reports, information, and vulnerabilities associated with packages 330 to backend component 350. Thus, backend component 350 may identify vulnerabilities of packages 330 by accessing vulnerability database 370 with corresponding package information. In one aspect, the database of vulnerabilities is stored in a location other than an endpoint.

As vulnerabilities are identified, backend component 350 may further notify an administrator of such vulnerabilities, display vulnerabilities to an administrator, etc. for fixing the vulnerabilities. For example, an administrator can apply security patches and/or updates provided by vendors.

Figure 4:
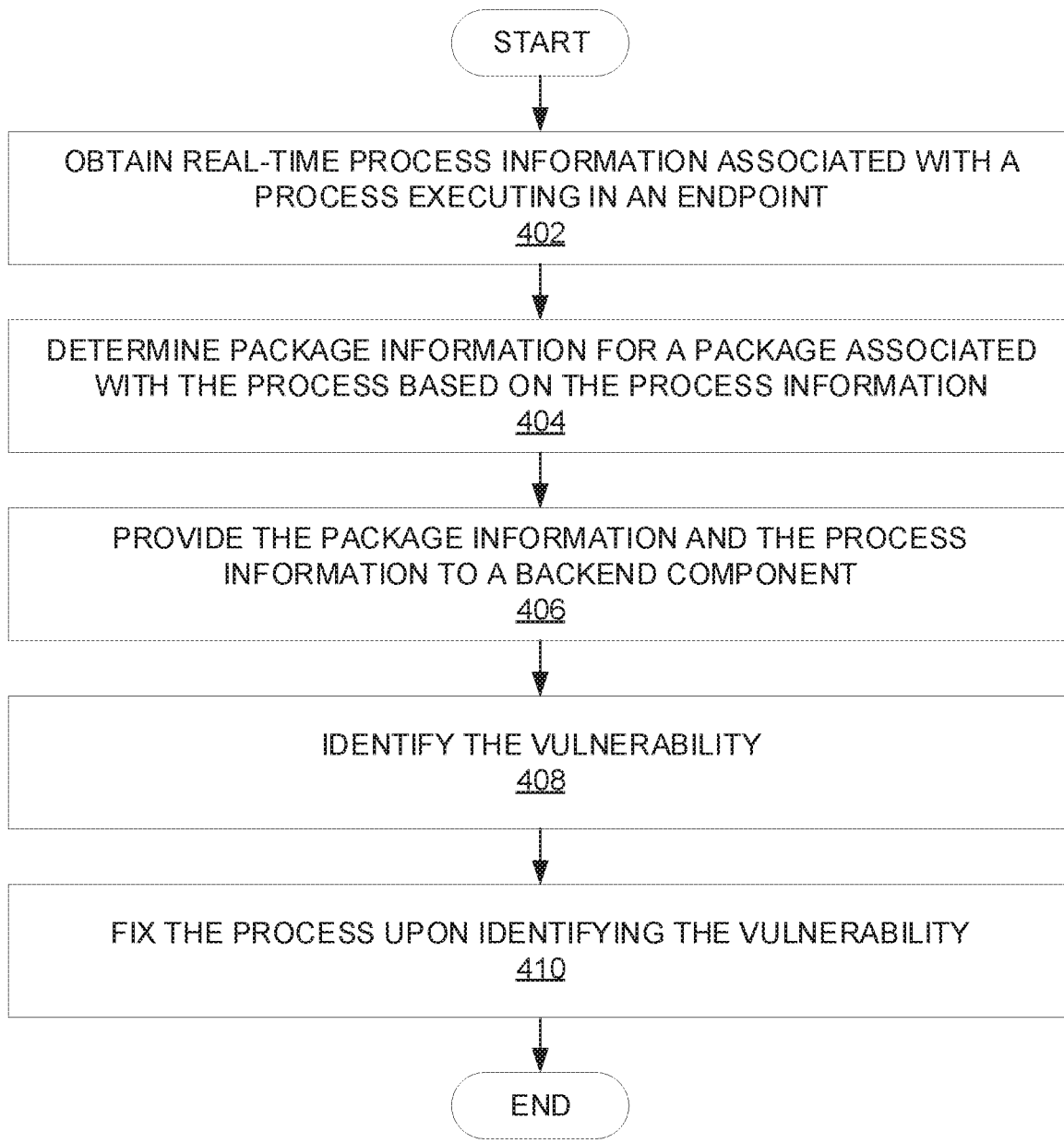
FIG. 4 illustrates an example method for detecting hidden vulnerabilities in an example process associated with an example package, in accordance with one aspect of the present technology.

FIG. 4 illustrates an example method 400 for detecting vulnerabilities in an example process associated with an example package in an example sensor using an example backend component and an example vulnerability database, in accordance with one aspect of the present technology. Example method 400 can identify vulnerabilities in process running in a network environment, such as an enterprise network. FIG. 4 will be described from the perspective of a process vulnerability mapping system, such as process vulnerability mapping system 300, which may be the same or similar to analytics engine 110 of FIG. 1. It should be understood that one or more processors may execute computer-readable instructions stored on one or more associated memories to implement functionalities of sensor 310 and steps of FIG. 4 described below. FIG. 4 may be described with reference to FIGS. 1-3.

Method 400 begins at step 402, in which process vulnerability mapping system 300 obtains real-time process information associated with a process executing on an endpoint. For example, sensor 310 may create a running snapshot of processes executing thereon. The snapshot of processes may show a process, such as Microsoft Word. Additionally, the snapshot may include process information, such as the process name (e.g. word.exe), the executable path (e.g. C://Program Files/Microsoft Office/word.exe), etc. Thus, the process information can include process attributes as discussed above with respect to FIG. 3. As another example, one or more processors 360 may receive the running snapshot of processes executing on sensors 310. In one aspect, the process information of the process is obtained by one or more sensors 310 running on the endpoint. In one aspect, the process information may include an executable path and filename for the process.

At step 404, process vulnerability mapping system 300 determines and/or collects package information for a package associated with the process based on the process information. The package information can include package attributes as discussed above with respect to FIG. 3. Continuing the above example, the process vulnerability mapping system 300 can, based on the executable path of the process, find the package and determine that the package information includes the process (e.g. Microsoft Word) above. In one aspect, one or more sensors 310 of process vulnerability mapping system 300 determines the package based on the executable path and filename of the process. In one aspect, the package information includes a package name, a package version, and a package publisher. Thus, process vulnerability mapping system 300 can associate running processes with packages based on process information.

At step 406, process vulnerability mapping system 300 provides the package information and the process information to a backend component 350 to identify a vulnerability associated to the package information. For example, one or more sensors 310 may send process information including, but not limited to, process name, process ID, and executable path, and package name to backend component 350. As discussed above, backend component 350 may have a database of vulnerabilities for packages. In other words, the database of vulnerabilities may be stored in a location other than the endpoint.

At step 408, process vulnerability mapping system 300 identifies the vulnerability. More specifically, process vulnerability mapping system 300 may identify at least one vulnerability associated to the package based on package information and information stored in the database of vulnerabilities. Additionally, process vulnerability mapping system 300 can identify at least one vulnerability associated with the package information using a database of vulnerabilities stored on a backend component of process vulnerability mapping system 300. In one aspect, the process vulnerability mapping system 300 identifies the vulnerability by receiving data indicating the vulnerability from the backend component 350. Thus, process vulnerability mapping system 300 can associate vulnerabilities, such as CVEs, with running processes based on package information and information stored in the database of vulnerabilities.

At step 410, process vulnerability mapping system 300 then fixes the process 320 upon identifying the vulnerability. In other words, process vulnerability mapping system 300 fixes the at least one vulnerability. For example, process vulnerability mapping system 300 may update the package with a version without the vulnerability. As another example, process vulnerability mapping system 300 may report the one or more vulnerabilities, so that an update can be applied to fix the one or more vulnerabilities.

In some scenarios, sensors 310 may also collect information about installed updates, such as Knowledge Base ID and state, and send the installed updates information to backend component 350. Backend component 350 can then update the database of vulnerabilities.

With example systems, network environment and mechanisms and systems for identifying, detecting, and/or assessing hidden vulnerabilities described with reference to FIGS. 1-4, the disclosure now turns to description of example system components and architectures that can be used to implement components such as analytics engine 110, sensors 310, backend component 350, vulnerability database 370, network controller 118, etc.

Figure 5A:
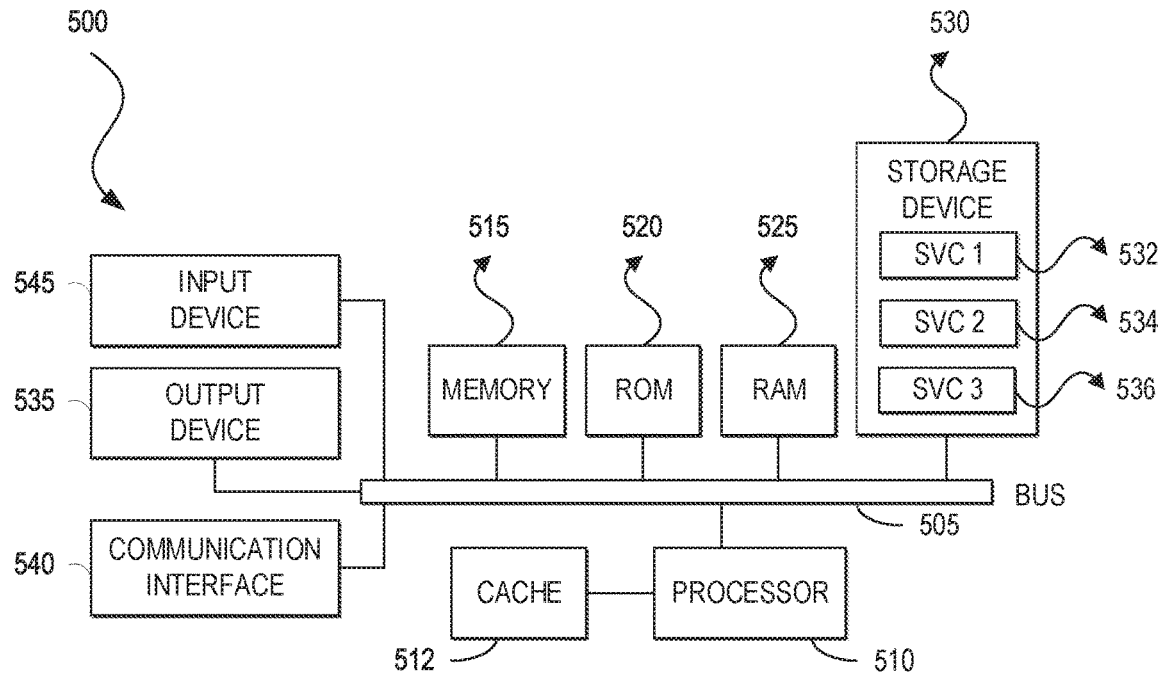
FIGS. 5A and 5B illustrate example system embodiments, in accordance with one aspect of the present technology.
Figure 5B:
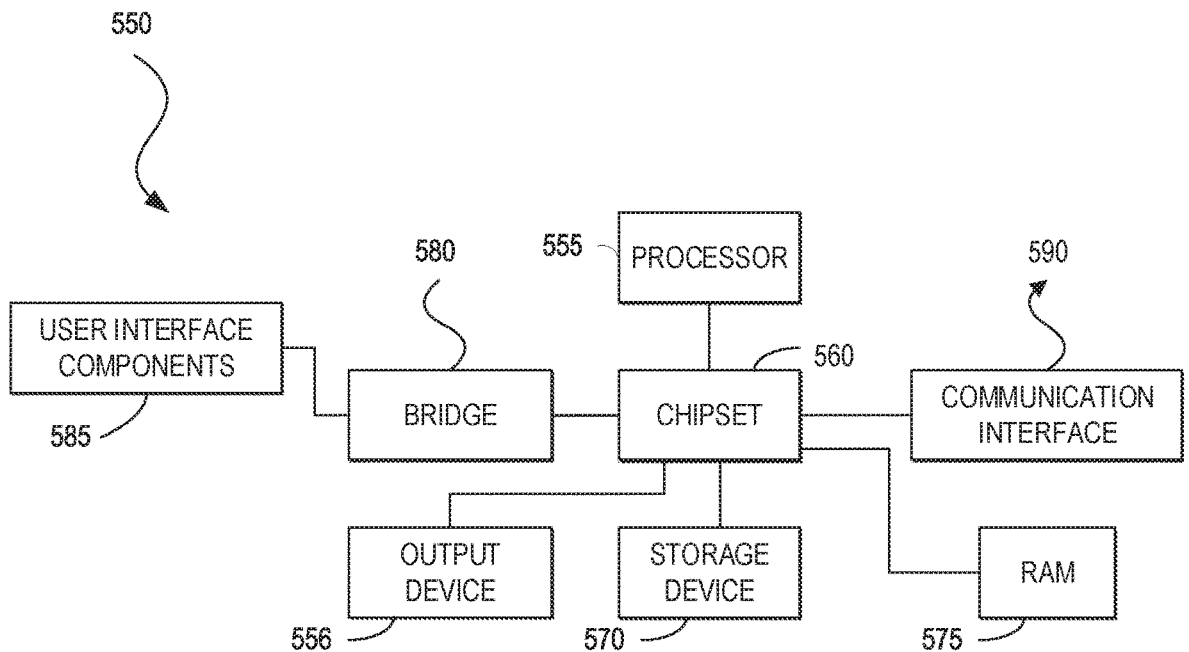

FIGS. 5A and 5B illustrate systems in accordance with various embodiments. The more appropriate system will be apparent to those of ordinary skill in the art when practicing the various embodiments. Persons of ordinary skill in the art will also readily appreciate that other systems are possible.

FIG. 5A illustrates an example of a bus computing system 500 wherein the components of the system are in electrical communication with each other using a bus 505. The computing system 500 can include a processing unit (CPU or processor) 510 and a system bus 505 that may couple various system components including the system memory 515, such as read only memory (ROM) 520 and random access memory (RAM) 525, to the processor 510. The computing system 500 can include a cache 512 of high-speed memory connected directly with, in close proximity to, or integrated as part of the processor 510. The computing system 500 can copy data from the memory 515, ROM 520, RAM 525, and/or storage device 530 to the cache 512 for quick access by the processor 510. In this way, the cache 512 can provide a performance boost that avoids processor delays while waiting for data. These and other modules can control the processor 510 to perform various actions. Other system memory 515 may be available for use as well. The memory 515 can include multiple different types of memory with different performance characteristics. The processor 510 can include any general purpose processor and a hardware module or software module, such as services (SVC) 1 532, SVC 2 534, and SVC 3 536 stored in the storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing system 500, an input device 545 can represent any number of input mechanisms, such as a microphone for speech, a touch-protected screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing system 500. The communications interface 540 can govern and manage the user input and system output. There may be no restriction on operating on any particular hardware arrangement and therefore the basic features here may easily be substituted for improved hardware or firmware arrangements as they are developed.

The storage device 530 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 530 can include the software SVCs 532, 534, 536 for controlling the processor 510. Other hardware or software modules are contemplated. The storage device 530 can be connected to the system bus 505. In some embodiments, a hardware module that performs a particular function can include a software component stored in a computer-readable medium in connection with the necessary hardware components, such as the processor 510, bus 505, output device 535, and so forth, to carry out the function.

FIG. 5B illustrates an example architecture for a chipset computing system 550 that can be used in accordance with an embodiment. The computing system 550 can include a processor 555, representative of any number of physically and/or logically distinct resources capable of executing software, firmware, and hardware configured to perform identified computations. The processor 555 can communicate with a chipset 560 that can control input to and output from the processor 555. In this example, the chipset 560 can output information to an output device 556, such as a display, and can read and write information to storage device 570, which can include magnetic media, solid state media, and other suitable storage media. The chipset 560 can also read data from and write data to RAM 575. A bridge 580 for interfacing with a variety of user interface components 585 can be provided for interfacing with the chipset 560. The user interface components 585 can include a keyboard, a microphone, touch detection and processing circuitry, a pointing device, such as a mouse, and so on. Inputs to the computing system 550 can come from any of a variety of sources, machine generated and/or human generated.

The chipset 560 can also interface with one or more communication interfaces 590 that can have different physical interfaces. The communication interfaces 590 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 555 analyzing data stored in the storage device 570 or the RAM 575. Further, the computing system 550 can receive inputs from a user via the user interface components 585 and execute appropriate functions, such as browsing functions by interpreting these inputs using the processor 555.

It will be appreciated that computing systems 500 and 550 can have more than one processor 510 and 555, respectively, or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:
1. A method comprising:
obtaining, at a network controller and from one or more sensors running on one or more endpoints, real-time process information associated with at least one process executing on at least one of the one or more endpoints, wherein the network controller is communicatively connected to the one or more endpoints over a communication network;

determining, at the network controller, package information for a corresponding package associated with the at least one process based on the real-time process information; and identifying, at the network controller and during runtime of the at least one process on the at least one of the one or more endpoints, at least one vulnerability associated with the package information using a database of vulnerabilities available only to the network controller.

2. The method of claim 1, wherein the real-time process information includes an executable path and a filename for the at least one process.

3. The method of claim 1, wherein the package information includes a package name, a package version and a package publisher.

4. The method of claim 1, wherein the database of vulnerabilities is not stored at the endpoint.

5. The method of claim 1, further comprising:
fixing the at least one vulnerability.

6. A non-transitory computer-readable medium comprising computer-readable instructions, which when executed by one or more processors at a network controller, cause the network controller to:

obtain, from one or more sensors running on one or more endpoints, real-time process information associated with at least one process executing on at least one of the one or more endpoints, wherein the network controller is communicatively connected to the one or more endpoints over a communication network;

determine package information for a corresponding package associated with the at least one process based on the real-time process information; and identify, during runtime of the at least one process on the at least one of the one or more endpoints, at least one vulnerability associated with the package information using a database of vulnerabilities available only to the network controller.

7. The non-transitory computer-readable medium of claim 6, wherein the real-time process information includes an executable path and a filename for the at least one process.

8. The non-transitory computer-readable medium of claim 6, wherein the package information includes a package name, a package version and a package publisher.

9. The non-transitory computer-readable medium of claim 6, wherein the database of vulnerabilities is not stored at the endpoint.

10. The non-transitory computer-readable medium of claim 6, wherein the computer-readable instructions, which when executed by the one or more processors, cause the network controller to:
fix the at least one vulnerability.

11. A network controller comprising:
one or more processors storing computer-readable instructions; and
one or more processors configured to execute the computer-readable instructions to:

obtain, from one or more sensors running on one or more endpoints, real-time process information associated with at least one process executing on at least one of the one or more endpoints, wherein the network controller is communicatively connected to the one or more endpoints over a communication network;

determine package information for a corresponding package associated with the at least one process based on the real-time process information; and identify, during runtime of the at least one process on the at least one of the one or more endpoints, at least one vulnerability associated with the package information using a database of vulnerabilities available only to the network controller.

12. The device of claim 11, wherein the real-time process information includes an executable path and a filename for the at least one process.

13. The device of claim 11, wherein the package information includes a package name, a package version and a package publisher.

14. The device of claim 11, wherein the database of vulnerabilities is not stored at the endpoint.

15. The device of claim 11, wherein the network controller is further configured to:
fix the at least one vulnerability.

* * * * *